United States Patent

Hilton, Sr.

[11] Patent Number: 5,938,812
[45] Date of Patent: Aug. 17, 1999

[54] METHOD FOR CONSTRUCTING A COHERENT IMAGING BUNDLE

[75] Inventor: Albert Ray Hilton, Sr., Richardson, Tex.

[73] Assignee: Amorphous Materials, Inc., Garland, Tex.

[21] Appl. No.: 09/078,605

[22] Filed: May 14, 1998

[51] Int. Cl.$^6$ .................................................. C03B 37/028
[52] U.S. Cl. ................................. 65/408; 65/410; 156/174
[58] Field of Search .................. 65/408, 410; 242/437.1, 242/437.2, 583; 156/174, 173, 172, 175

[56] References Cited

U.S. PATENT DOCUMENTS

| | | | |
|---|---|---|---|
| 3,033,731 | 5/1962 | Cole | 65/410 |
| 3,215,029 | 11/1965 | Woodcock | 65/410 |

FOREIGN PATENT DOCUMENTS

| | | | |
|---|---|---|---|
| 1930090 | 5/1973 | Germany | 665/410 |
| 47-42342 | 10/1972 | Japan | 65/410 |

*Primary Examiner*—John Hoffmann
*Attorney, Agent, or Firm*—Locke Liddell & Sapp LLP

[57] ABSTRACT

A method for constructing a glass fiber imaging bundle includes drawing a continuous glass fiber from a dispenser. The dispenser is mounted for movement parallel to a drum having first, second, and third areas around the drum's circumference. The fiber is affixed to the drum at a location in the first area. The drum continuously rotates during the present process as the fiber is wound around the surface of the drum in the second area. The dispenser moves from a location adjacent to the first area to a location adjacent the third area. Once a ribbon is created, the fiber is dispensed to a location in the third area. The fiber is affixed to the surface of the drum in the third area, and the fiber is then dispensed from the third area to a second location in the first area. The fiber transversing the second area is cut and removed from the surface of the drum. The fiber is then dispensed from the second location in the first area towards the second area and the above steps are repeated to form a plurality of layers of fiber around the surface of the drum in the second area to form a fiber bundle in the second area. The fiber bundle in the second area is formed in a channel. The channel and the bundle are then removed from the drum when the bundle is completed.

11 Claims, 5 Drawing Sheets

METHOD FOR CONSTRUCTING A COHERENT IMAGING BUNDLE

TECHNICAL FIELD OF THE INVENTION

The present invention relates to coherent imaging bundle construction, and more particularly to a method for constructing a coherent imaging bundle in a continuous manner on a drum where all ribbon layers are wound in the same direction and the bundle is contained in a channel.

BACKGROUND OF THE INVENTION

During the construction of imaging bundles, small diameter glass fibers are drawn, guided to a drum, and wound side by side to form a ribbon around the drum. When the ribbon count is reached, the drum is indexed rapidly in the opposite direction to provide a space between each ribbon and the process is repeated until the drum has been filled. The smaller the diameter of the fiber, the better the optical performance of the bundle can be achieved in terms of resolution of small geometry images. Other factors concerning optical performance include packing density or per cent active area, and uneven packing in geometry which causes image distortion, and broken or dead fibers.

Bundles may be formed using a process in which ribbons are removed from the drum and stacked one on top of the other in a stacking tool in which pressure from top and side is applied to increase the packing density. After the stacking process is complete, the ribbons are glued together, the bundle is cut at the center of the fused region, and the bundle ends are coherent with respect to one another. However, during the stacking procedure, if the ribbons are inadvertently rotated 180 degrees, the rotated ribbon has its fiber shifted, thereby destroying the coherence of that particular element relative to the others. The performance of the optical bundle will be significantly decreased. Although the best and closest alignment of the fibers occurring during the drawing/winding process, much of the perfection is lost during stacking. Compressing the ribbons from top and side very often breaks fibers and distorts the geometry of the ribbon.

A need has thus arisen for a process to construct a coherent imaging bundle in which ribbons are wound one on top of the other while fiber transverses in the same direction on a drum. In this manner, the coherence of the bundle will be preserved with ribbons accurately stacked.

SUMMARY OF THE INVENTION

In accordance with the present invention, a method for constructing a glass fiber imaging bundle includes drawing a continuous glass fiber from a dispenser. The dispenser is mounted for movement parallel to a drum having first, second, and third areas around the drum's circumference. The fiber is affixed to the drum at a location in the first area. The drum continuously rotates during the present process as the fiber is wound around the surface of the drum. The dispenser moves from a location adjacent to the first area to a location adjacent the third area. Once a ribbon is created, the fiber is dispensed to a location in the third area. The fiber is affixed to the surface of the drum in the third area, and the fiber is then dispensed from the third area to a second location in the first area. The fiber transversing the second area is cut and removed from the surface of the drum. The fiber is then dispensed from the second location in the first area towards the second area and the above steps are repeated to form a plurality of layers of fiber around the surface of the drum in the second area to form a fiber bundle in the second area. The fiber bundle in the second area is formed in a channel. The channel and the bundle are then removed from the drum when the bundle is completed.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
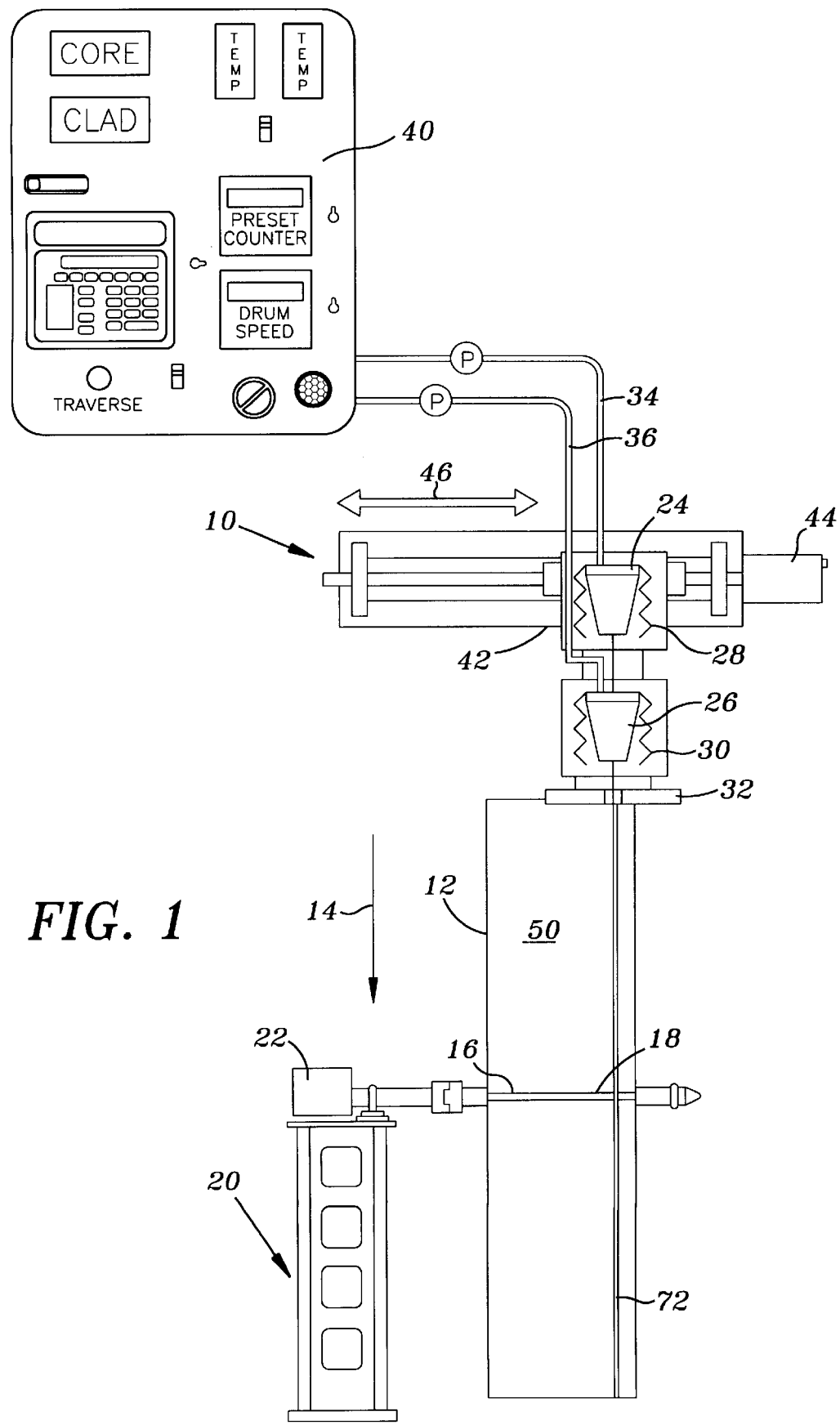
FIG. 1 is a diagrammatic illustration of a fiber drawing tower and drum utilized in accordance with the present method for forming a coherent imaging bundle.
Figure 2:
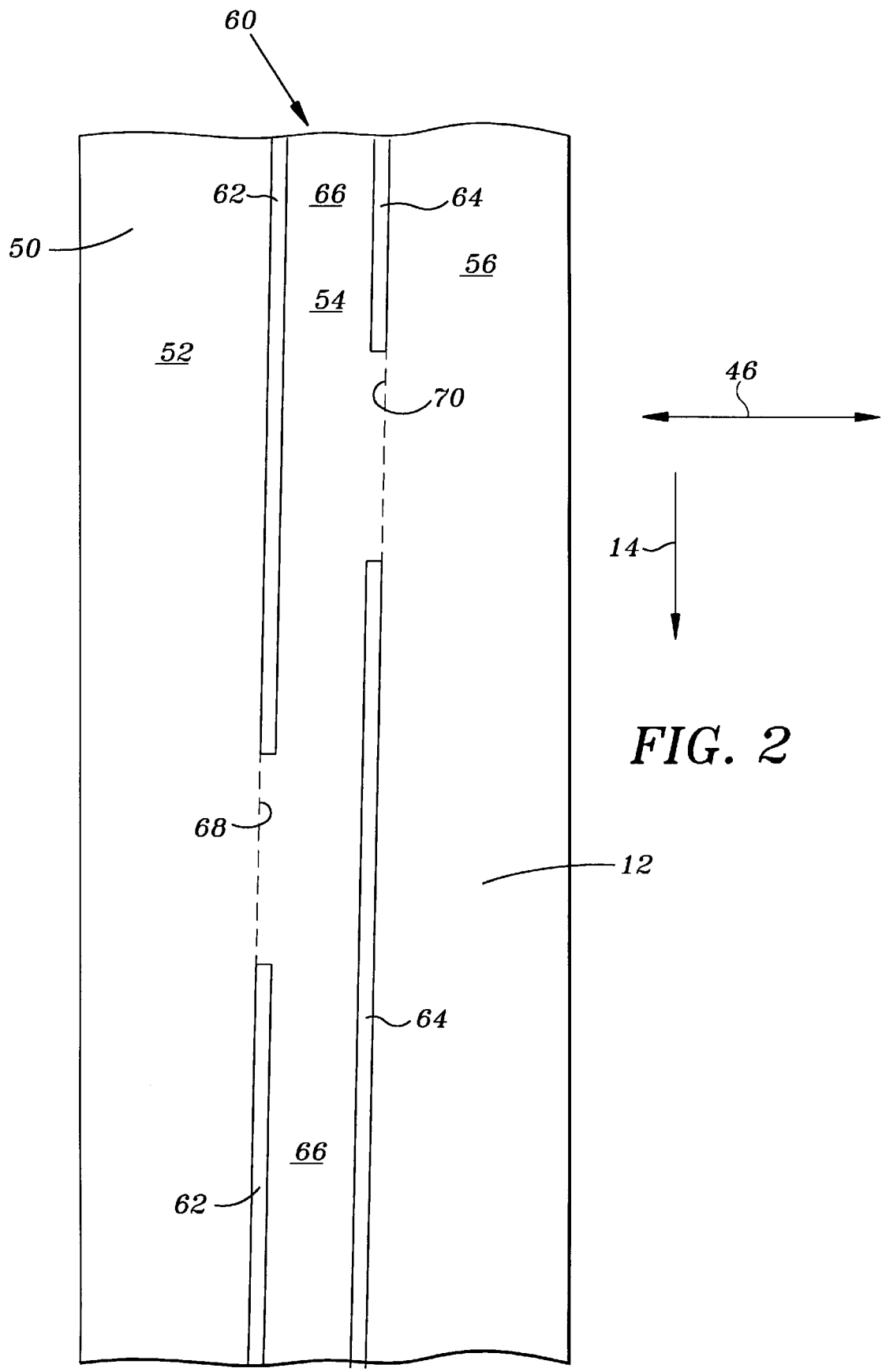
FIGS. 2–5 illustrate the steps of the method of the present invention.

Referring to FIG. 1, the present method for forming a coherent imaging bundle utilizes a glass fiber drawing tower, generally identified by the numeral 10 and a drum 12. Drawing tower 10 is located above drum 12 and is mounted for transverse movement for dispensing fiber onto the surface of drum 12. Drum 12 rotates in the direction indicated by arrow 14 about a longitudinal axis 16 through the center of drum 12. Drum 12 rotates about longitudinal axis 16 on a shaft 18 which is supported on a stanchion 20. Shaft 18 is rotated utilizing a motor 22.

Fiber drawing tower 10 includes a core glass crucible and die 24 and a clad glass crucible and die 26. Dies 24 and 26 each have an associated oven 28 and 30, respectively. Fiber is drawn through a laser diameter gauge 32 for deposit and winding on drum 12. Each crucible and die 24 and 26 has an associated crucible pressurization manifold 34 and 36, respectively. Drawing tower 10 is controlled by a controller 40 for controlling the temperature of the core and clad material, transverse positioning of tower 10 as well as the speed of drum 12. Tower 10 moves in a transverse direction with respect to drum 12 through a layup transverse mechanism 42 having a motor 44 controlled by controller 40. Although the use of tower 10 is shown in FIG. 1, the present method can be used with previously formed glass fiber, dispersed from mechanism 42 in the manner herein described.

Mechanism 42 moves in the direction of arrow 46. Drum 12 rotates continuously during the process of the present invention while tower layup transverse mechanism 42 moves from side to side above the surface of drum 12 to deposit fibers to form multiple ribbons and thereby form a bundle. Drum 12 may have a circumference of, for example, 10 meters and rotate at a speed of one revolution per two minutes.

Referring now to FIGS. 2–5, a portion of the surface of drum 12 is illustrated in schematic form. Drum 12 includes a cylindrical surface 50 having three areas, 52, 54, and 56. Areas 52, 54, and 56 are disposed side by side on surface 50 of drum 12. Disposed in area 54 is a generally U-shaped flexible plastic channel 60, also shown in FIG. 6. Channel 60 has vertical side walls 62 and 64 joined together by a wall 66. Wall 66 is disposed on surface 50 of drum 12. Wall 62 of channel 60 includes a gap 68. Wall 64 of channel 60 includes a gap 70.

Figure 3:
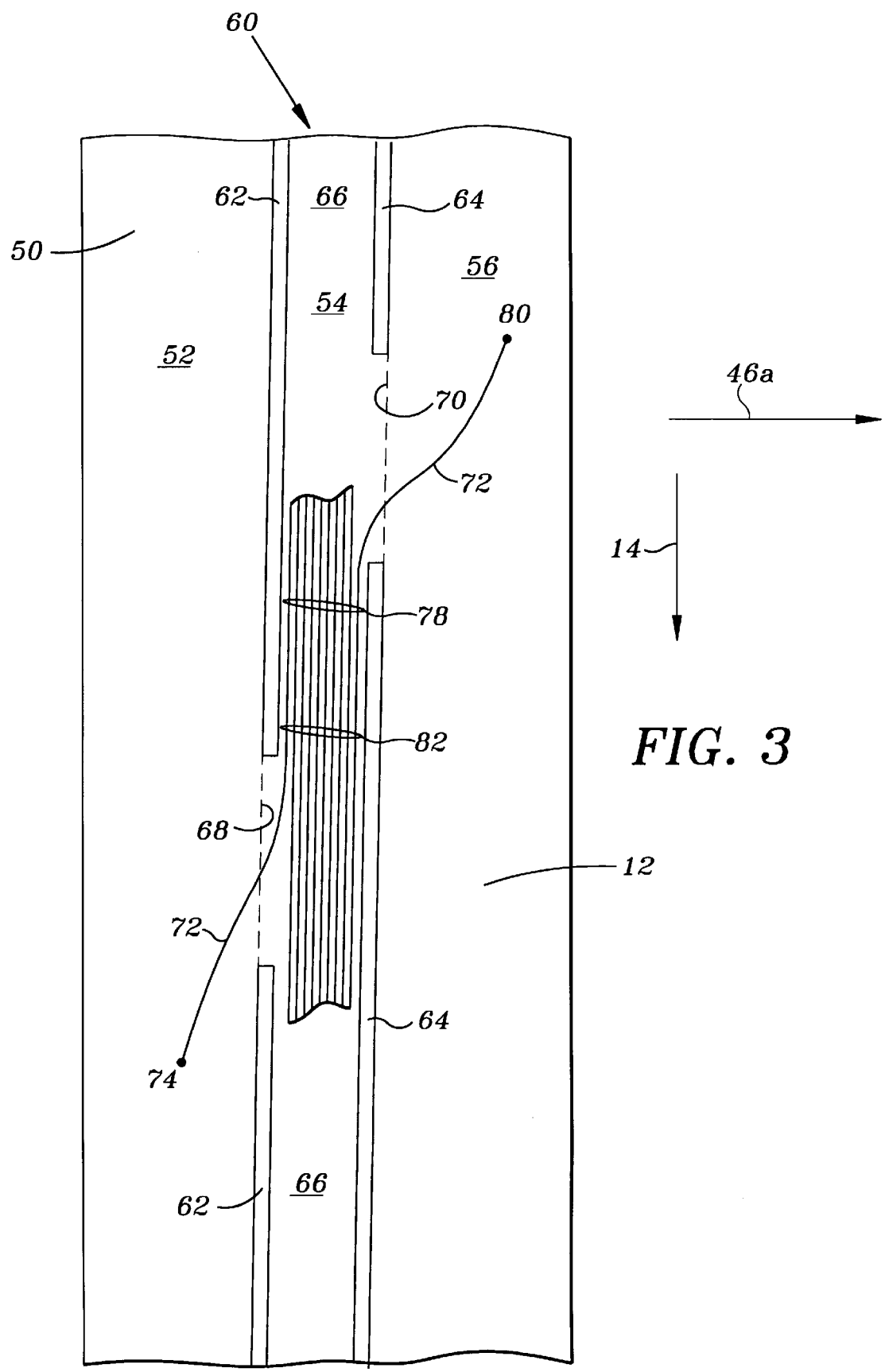

Referring to FIG. 3, in accordance with the present invention, as drum 12 rotates in the direction of arrow 14, fiber 72 is drawn from drawing tower 10. The end of the fiber 72 is affixed by tape, or the like, to a location identified by reference numeral 74 within area 52 of drum surface 50. The fiber 72 is wound through gap 68 within wall 62 of channel 60. The fiber 72 is continuously wound within area 54 as tower transverse mechanism 42 moves above drum surface 50 from area 52 towards area 56 indicated by arrow 46*a*. In this manner, a single layer of fiber 72 is dispensed by tower 10 within channel 60 between walls 62 and 64. Fiber 72 is dispensed having a thickness of the diameter of the fiber and uniformly extends within channel 60 to form a ribbon 78. As transverse mechanism 42 moves towards wall 64 of channel 60, fiber 72 exits channel wall 64 through gap 70 to a location 80 within area 56. Fiber 72 is affixed at location 80 by tape, or the like. A thin coat of epoxy is applied to ribbon 78 in the area 82 within channel 60.

Figure 4:
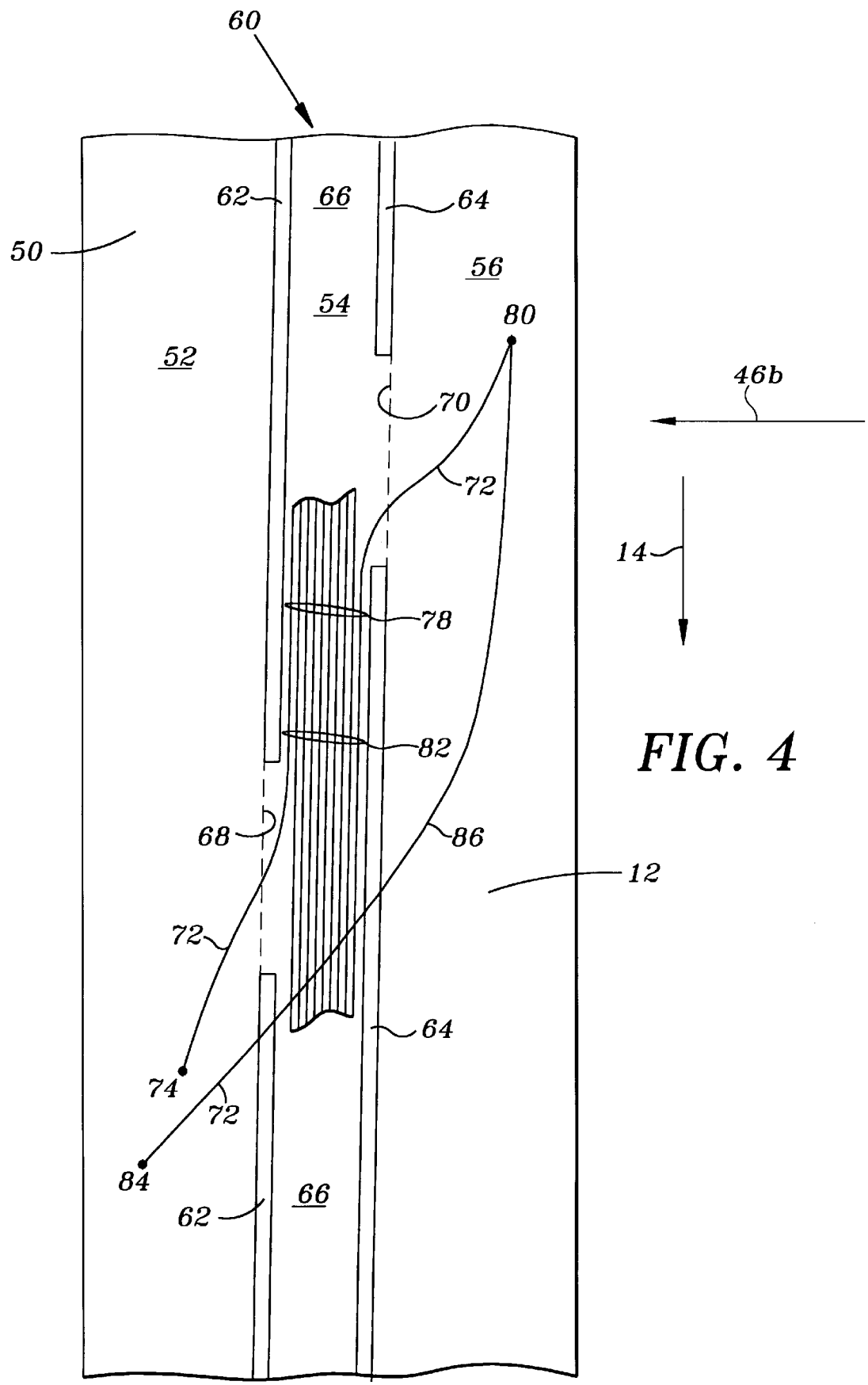

Referring to FIG. 4, transverse mechanism 42 is then moved in the direction of arrow 46*b* such that fiber 72 moves from location 80 to a new location 84 within area 52 on surface 50 of drum 12. This transverse movement from area 56 towards area 52 results in a fiber segment 86 extending between locations 80 and 84. Segment 86 is then cut, and removed from surface 50 of drum 12.

Figures 5, 6:
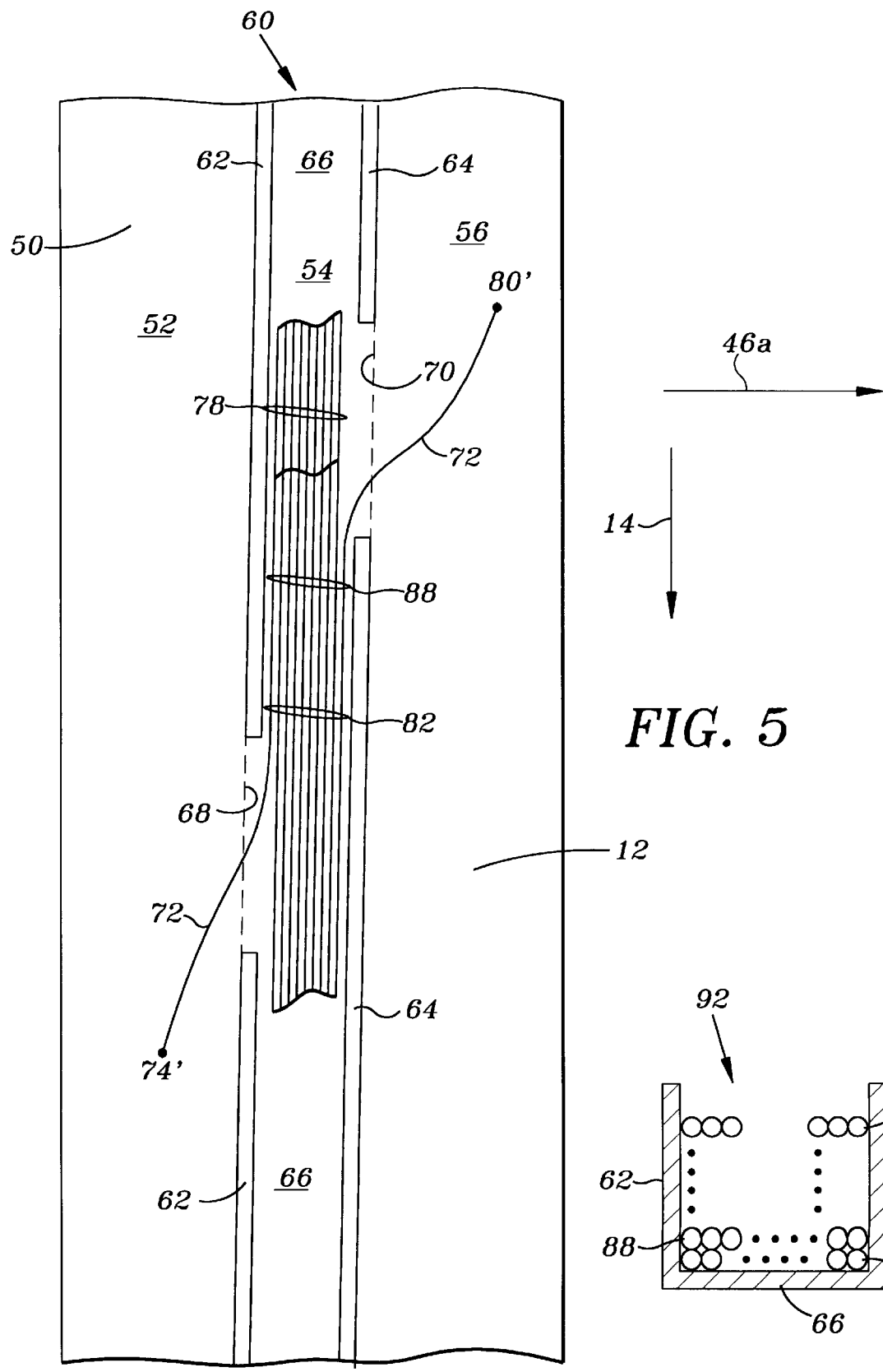
FIG. 6 is an end view of the imaging bundle and channel constructed in accordance with the present invention.

Referring to FIG. 5, the process of forming a second ribbon disposed above ribbon 78 is then initiated by fiber 72 affixed at location 74', re-entering gap 68 within wall 62 as transverse mechanism 42 begins to move from area 52 to area 56 in the direction of arrow 46*a* while winding a ribbon 88 within channel 60. When the second ribbon 88 is completed, transverse mechanism 42 moves fiber 72 through gap 70 within wall 64 of channel 60 to location 80'. Epoxy is applied to ribbon 88 at location 82, the same location as epoxy was applied to ribbon 78. Fibers 72 in each ribbon are in contact with each other only in the region 82 at which epoxy is applied.

As illustrated in FIG. 6, the present process continues adding ribbon 90 until the desired number of ribbons are formed within channel 60 to complete a fiber imaging bundle 92. The bundle 92 is removed from surface 50 of drum 12 by removing channel 60. Channel 60 and the bundle 92 contained therein is cut in the area of epoxy 82. The bundle 92 remains in channel 60 which becomes the outside container for the bundle 92, thereby protecting the bundle 92.

If it is desired to form bundles 92 having lengths less than the circumference of drum 12, multiple areas 82 of epoxy can be applied to ribbons with channel 60, and then each area 82 cut resulting in multiple bundles being formed, the total length of the bundles equaling the length of the circumference of drum 12.

Fiber 72 may comprise, for example, silicate or fluoride glasses or formed from infrared transmitting chalcogenide glasses and have a core diameter in the range of, for example, about 0.0001–0.010 inches.

It therefore can be seen that the present method results in the formation of a coherent imaging bundle which increases packing density while minimizing breakage and maintains coherency. Imaging ribbons are wound one on top of the another and completely contained within the channel. The ribbons are not handled individually, and the bundle is formed in a single continuous winding process.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A method for constructing a glass fiber imaging bundle, comprising:
   (a) providing a drum having a cylindrical surface, the surface having first, second, and third areas extending around the drum surface, the second area disposed between the first and third areas, the drum having a longitudinal axis disposed equidistance from the surface and being horizontally disposed;
   (b) drawing a continuous glass fiber from a dispenser, the dispenser being mounted for movement parallel to the drum axis and adjacent to the first, second, and third areas;
   (c) affixing the fiber to a first location in the first area;
   (d) rotating the drum about the drum axis;
   (e) drawing the fiber from the first location in the first area toward the second area;
   (f) winding the fiber around the surface of the drum in the second area to form a layer of fiber as the dispenser moves from a location adjacent to the first area to a location adjacent to the third area, the layer having a thickness of the diameter of the fiber and extending uniformly throughout the second area;
   (g) drawing the fiber from the dispenser to a location in the third area;
   (h) affixing the fiber to the surface of the drum at the location in the third area;
   (i) drawing the fiber from the dispenser from the affixed location in the third area, and across the second area to a second location in the first area;
   (j) affixing the fiber to the surface of the drum at the second location in the first area;
   (k) cutting the fiber adjacent to the affixed location in the third area and adjacent to the second location in the first area to form a fiber segment;
   (l) removing the fiber segment from the surface of the drum;
   (m) drawing the fiber from the dispenser from the second location in the first area toward the second area;
   (n) repeating steps (f) through (m) to thereby form a plurality of layers of fiber around the surface of the drum in the second area to form a fiber bundle in the second area; and
   (o) removing the bundle from the drum.

2. The method of claim 1 and further including applying adhesive to a portion of each layer after each layer of fiber is wound around the surface of the drum.

3. The method of claim 2 wherein the bundle is removed from the drum by cutting the plurality of layers in the area where adhesive has been applied.

4. The method of claim 1 wherein the bundle is removed from the drum by cutting the plurality of layers on the surface of the drum.

5. The method of claim 1 and further including:
   placing a U-shaped channel on the surface of the drum in the second area to thereby separate the second area from the first area and from the third area, the channel having first and second side walls, a gap formed in the first side wall to permit entrance of the fiber from the first area into the channel and a gap formed in the second wall to permit exit of the fiber from the channel to the third area.

6. The method of claim 5 and further including applying adhesive to a portion of each layer of fiber after each layer of fiber is wound around the surface of the drum.

7. The method of claim 6 wherein the bundle is formed within the channel.

8. The method of claim 7 wherein the bundle is removed from the drum by cutting the plurality of layers and the channel in the portion where adhesive has been applied, such that the bundle is contained within the channel when the channel is removed from the surface of the drum.

9. The method of claim 5 and further including applying adhesive to a plurality of locations of each layer of fiber after each layer of fiber is wound around the surface of the drum.

10. The method of claim 9 wherein the bundle is formed within the channel.

11. The method of claim 10 wherein the bundle is removed from the drum by cutting the plurality of layers and the channel in the plurality of locations where adhesive has been applied, such that a plurality of bundles are formed, having lengths less than the circumferences of the drum and wherein each of said plurality of bundles is contained in a portion of the channel.

* * * * *